US009647324B2

(12) United States Patent
Hall et al.

(10) Patent No.: US 9,647,324 B2
(45) Date of Patent: May 9, 2017

(54) SYSTEM AND METHOD FOR REDUCING REFLECTIONS FROM METALLIC SURFACES ONTO AIRCRAFT ANTENNAS

(71) Applicant: Garmin International, Inc., Olathe, KS (US)

(72) Inventors: Jeffrey S. Hall, Bucyrus, KS (US); Bharath Parthasarathy, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 454 days.

(21) Appl. No.: 14/500,534

(22) Filed: Sep. 29, 2014

(65) Prior Publication Data
US 2015/0288073 A1    Oct. 8, 2015

Related U.S. Application Data

(60) Provisional application No. 61/911,632, filed on Dec. 4, 2013.

(51) Int. Cl.
*G01S 13/93* (2006.01)
*H01Q 1/28* (2006.01)
(Continued)

(52) U.S. Cl.
CPC ........... *H01Q 1/28* (2013.01); *G01S 13/9303* (2013.01); *H01Q 3/24* (2013.01); *H01Q 3/26* (2013.01);
(Continued)

(58) Field of Classification Search
CPC ...... G01S 13/88; G01S 13/93; G01S 13/9303; G01S 7/02; G01S 7/28; G01S 7/2813; G01S 13/74; G01S 13/75; G01S 13/76; G01S 13/762; H01Q 1/27; H01Q 1/28; H01Q 3/24; H01Q 3/26; H01Q 15/14; H01Q 21/28; H01Q 1/52; H01Q 1/521; H01Q 1/523; H01Q 1/525; H01Q 1/526; H01Q 1/528; H01Q 17/00; H01Q 17/001;
(Continued)

(56) References Cited

U.S. PATENT DOCUMENTS 2,966,675 A  *  12/1960  Smoll ................... G01S 13/762
                                                                  342/379
3,122,737 A  *  2/1964  Setrin ................... G01S 13/762
                                                                  342/379
(Continued)

OTHER PUBLICATIONS

Printout from http://www.masttechnologies.com/rf-absorbers/,published prior to Sep. 29, 2014.
(Continued)

*Primary Examiner* — Bernarr Gregory
(74) *Attorney, Agent, or Firm* — Samuel M. Korte; Max M. Ali

(57) ABSTRACT

An aircraft traffic system is provided that includes a primary antenna operable to generate interrogation signals and receive interrogation replies from other aircraft. The system additionally includes a secondary antenna configured as a tuned absorber having a matched impedance to at least partially absorb reflections of the interrogation signals or interrogation replies utilized by the primary antenna.

21 Claims, 5 Drawing Sheets

(51) Int. Cl.
*H01Q 17/00* (2006.01)
*H01Q 3/26* (2006.01)
*H01Q 3/24* (2006.01)
*H01Q 21/28* (2006.01)
*G01S 13/00* (2006.01)
*H01Q 1/00* (2006.01)
*H01Q 15/14* (2006.01)

(52) U.S. Cl.
CPC ............ *H01Q 17/00* (2013.01); *H01Q 21/28* (2013.01); *H01Q 15/14* (2013.01)

(58) Field of Classification Search
CPC .. H01Q 17/002; H01Q 17/004; H01Q 17/005; H01Q 17/007; H01Q 17/008
USPC ............ 342/1–4, 27–51, 59, 175, 378–384; 343/907, 909
See application file for complete search history.

(56) References Cited

U.S. PATENT DOCUMENTS

| | | | | |
|---|---|---|---|---|
| 3,518,687 | A * | 6/1970 | Pocs | H01Q 17/001 343/909 |
| 5,081,457 | A * | 1/1992 | Motisher | G01S 13/9303 342/40 |
| 5,805,111 | A * | 9/1998 | Brettner, III | G01S 13/9303 342/29 |
| 6,768,444 | B2 * | 7/2004 | Langsford | G01S 7/2813 342/175 |
| 7,439,901 | B2 | 10/2008 | Needham et al. | 342/30 |
| 7,576,686 | B2 | 8/2009 | Needham et al. | 342/174 |
| 7,825,858 | B2 | 11/2010 | Blessing et al. | 342/442 |

OTHER PUBLICATIONS

Printout from http://en.wikipedia.org/wiki/Dummy_load, published prior to Sep. 29, 2014.

* cited by examiner

SYSTEM AND METHOD FOR REDUCING REFLECTIONS FROM METALLIC SURFACES ONTO AIRCRAFT ANTENNAS

CROSS-REFERENCE TO RELATED APPLICATIONS

The present application claims the benefit under 35 U.S.C. §119(e) of U.S. Provisional Application Ser. No. 61/911,632, filed Dec. 4, 2013, and titled "METHOD AND APPARATUS FOR REDUCING ELECTROMAGNETIC WAVE REFLECTION FROM METALLIC AIRCRAFT COMPONENTS ON TAS OR TCAS SYSTEMS," which is herein incorporated by reference in its entirety.

BACKGROUND

Aircraft are often equipped with a Traffic Advisory Systems (TAS) or Traffic Alert and Collision Avoidance System (TCAS) to provide traffic awareness functionality. TAS/TCAS systems are designed to interrogate target aircraft transponders and receive their replies, then process these replies to generate range and bearing to the target aircraft.

For example, TAS/TCAS systems transmit interrogation signals that are received and responded to by other aircraft and used to determine the location of the other aircraft relative to the interrogating aircraft's position. TAS/TCAS typically includes a four-element passive phased-array antenna electrically connected by coaxial cables to a radio-frequency transceiver. During transmission operations the antenna performs antenna pattern formation, and during reception operations the antenna determines bearing angles to the other aircraft. The transceiver is electrically connected to a signal processor that controls transmission and reception of TAS/TCAS-related information and performs aircraft surveillance operations such as traffic alert and collision avoidance operations.

TAS/TCAS identifies the locations and tracks the movements of other aircraft that are equipped with transponders, including determining ranges and bearings to the other aircraft based on response signals received from the other aircrafts' transponders. More specifically, the responses from interrogated aircraft include information that allows them to be located in cylindrical coordinates relative to the interrogating aircraft. This information is processed to estimate when the other aircraft may enter into the proximity of the interrogating aircraft and when the user should be made aware of the other aircraft with traffic advisories and resolution advisories (RAs) to move away from the other aircraft.

SUMMARY

An airborne traffic system is provided that includes a primary antenna operable to generate interrogation signals and receive interrogation replies from other aircraft. The system additionally includes a secondary antenna configured as a tuned absorber having a matched impedance to at least partially absorb reflections of the interrogation signals or interrogation replies utilized by the primary antenna.

This Summary is provided solely to introduce subject matter that is fully described in the Detailed Description and Drawings. This Summary is not intended to identify key or essential features of the claimed subject matter, nor is it intended to be used as an aid in determining the scope of the claimed subject matter.

BRIEF DESCRIPTION OF THE DRAWINGS

The Detailed Description refers to the accompanying figures. The use of the same reference numbers in different instances in the description and the figures may indicate similar or identical features.

DETAILED DESCRIPTION

Overview

Figure 1:
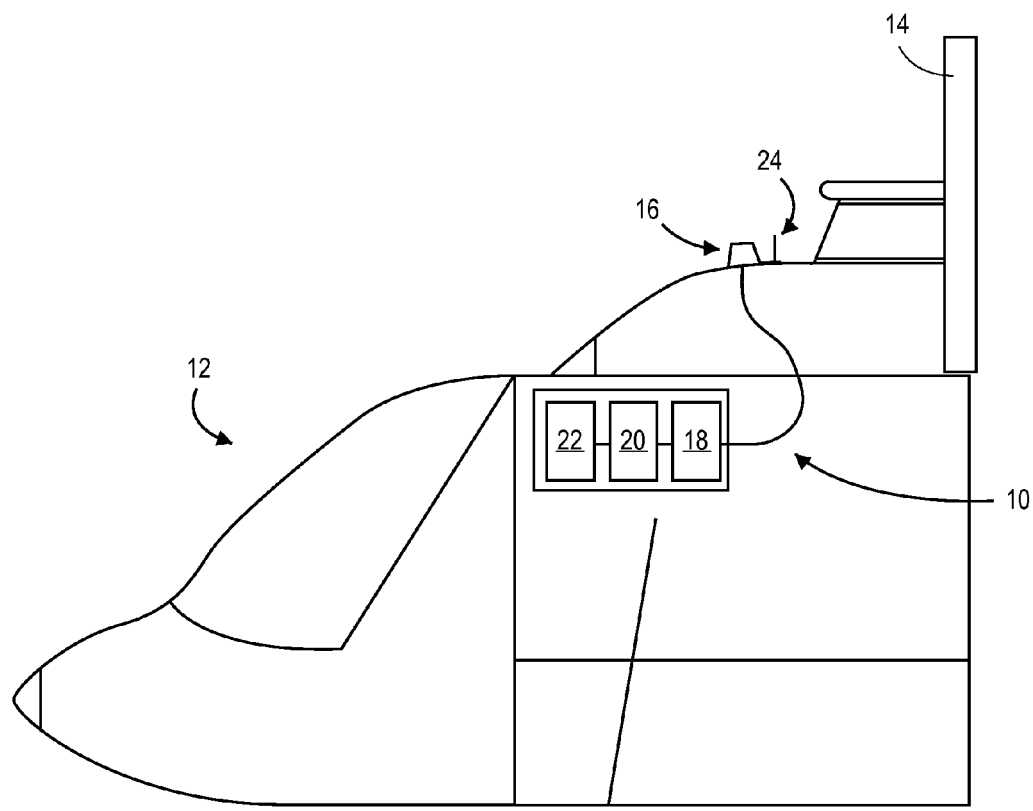
FIG. 1 is a fragmentary elevation view of a small aircraft on which an embodiment of the air-traffic information system of the present invention of has been installed.
Figure 2:
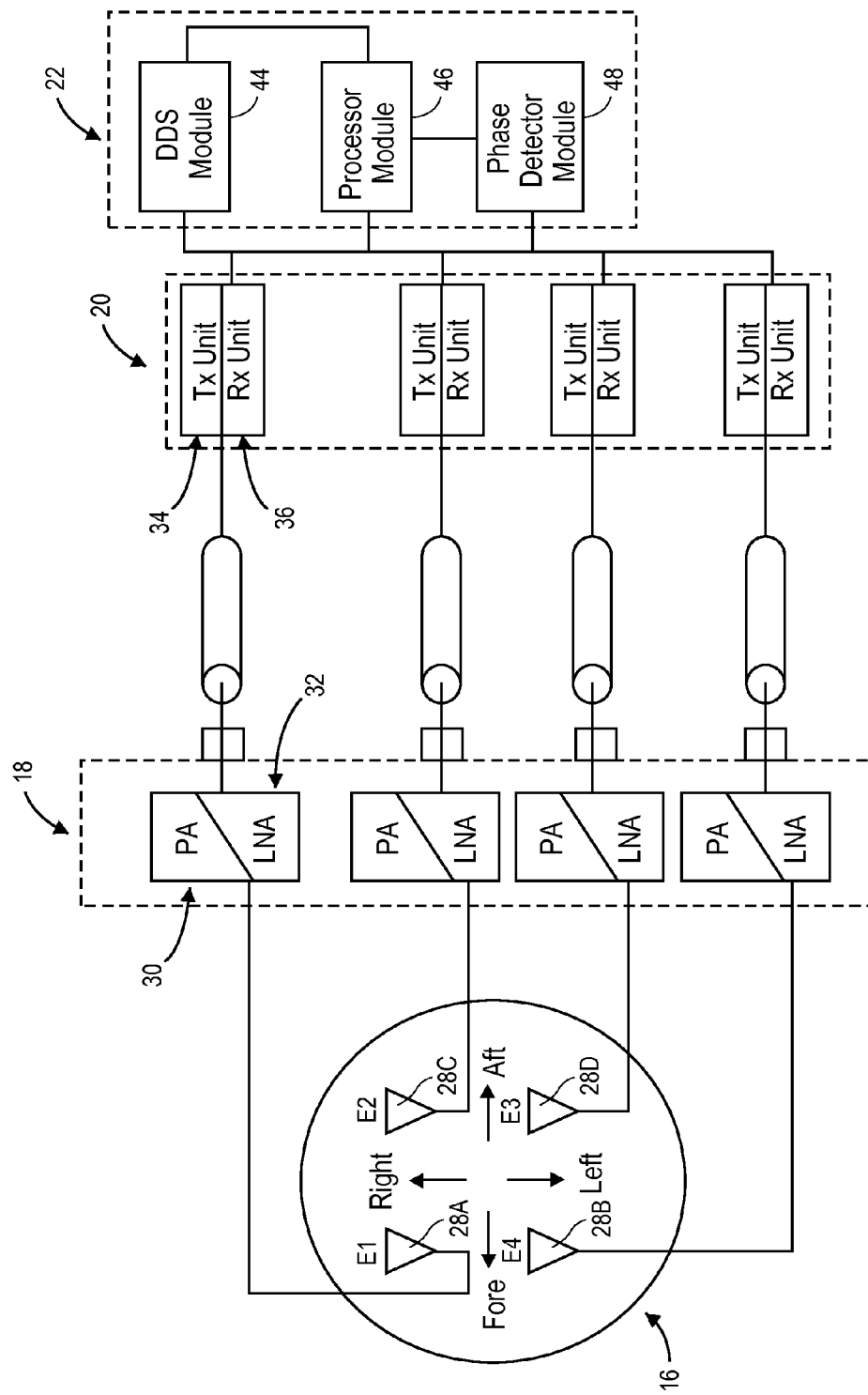
FIG. 2 is a block diagram of components of the air-traffic information system of FIG. 1.

Air-traffic information systems, such as TAS and TCAS, were originally designed for and installed on large aircraft. These installations may optimize the location of an antenna component of the systems such that reflections from metallic aircraft surfaces are small and do not greatly interfere with system performance. However, air-traffic information systems are now being installed on smaller aircraft, such as helicopters, UAVs, general aviation airframes, and other associated aircraft installations. These installations are more constrained with regard to positioning the system antenna, and reflective metallic surfaces (e.g., the rotor mast) extending above the ground plane in close proximity to the system antenna can create signal reflections that can reduce system performance, including interfering with the formation and amplitude of interrogations, interfering with the estimation of bearings and amplitudes of replies, ghosting (in which a single aircraft appears to be in more than one location), and bearing jumps (up to 180 degree flips). One solution to the problem of such reflections is to move the system antenna to an optimal position relative to the reflector, but, as mentioned, this is not always possible due to aircraft design constraints.

Embodiments of the present invention provide an airborne traffic system 10 and method for reducing electromagnetic wave reflections from reflective metallic components onto traffic system antennas. The system 10 may be installed on an aircraft 12 having one or more metallic materials 14 that at least partly reflect electromagnetic signals (e.g., radio-frequency signals). In embodiments, the aircraft 12 is a helicopter and the reflective material 14 is the helicopter's rotor mast. In other embodiments, the aircraft 12 is a fixed-wing aircraft and the reflective material 14 is portions of the aircraft's exterior surface (e.g., control surfaces, wings, vertical and horizontal stabilizers, etc.) The traffic system 10 may employ any suitable technology (e.g., TAS, TCAS, ACAS, and/or related technology) operable to transmit electromagnetic signals (e.g., interrogation signals) and receive electromagnetic signals containing information about other aircraft (e.g., interrogation replies).

In one embodiment, the system 10 may comprise a primary antenna 16 operable to generate interrogation signals and receive interrogation replies from other aircraft. The system 10 additionally includes a secondary antenna 24 configured as a tuned absorber having a matched impedance to at least partially absorb reflections of the interrogation signals or interrogation replies utilized by the primary antenna 16. The primary antenna 16 and secondary antenna 24 may be positioned on the exterior of the aircraft 12 and/or the interior of the aircraft 12.

The primary antenna 16 may include a plurality of antenna elements 28 operable to facilitate the transmission and reception of the electromagnetic signals—e.g., the interrogation signals. At least a portion of each antenna element 28 may project outside the aircraft 12 in such a manner that the reflective metallic material 14 is positioned above the antennas' ground plane. As described below, the system 10 may include housing 40 to house at least portions of the primary antenna 16 and antenna elements 28.

The primary antenna 16 may be of any suitable design and construction, and there may be any suitable number of antenna elements 28. For example, the primary antenna 16 may be an active or passive phased array antenna or a sum-difference antenna, operable to facilitate transmitting signals at one or more relevant frequencies (e.g., approximately between 1020 MHz and 1040 MHz, or approximately 1030 MHz) and receiving signals at one or more relevant frequencies (e.g., approximately between 1080 MHz and 1100 MHz, or approximately 1090 MHz), and there may be approximately between one and six antenna elements 28 (e.g., four antenna elements). The antenna elements 28 may be arranged according to a particular pattern and spacing. For example, the antenna elements 28 may be arranged in a polygonal pattern (e.g., square or diamond).

In configurations, the system 10 may include an amplification module 18 having a plurality of power amplifiers 30 and a plurality of low-noise amplifiers 32. Each of the plurality of power amplifiers 30 may be electrically connected to a different antenna element 28 of the primary antenna 16 and may be used during the transmission of signals to increase the power level of signals (e.g., interrogation signals or transponder reply messages from the host aircraft 12) generated by the system 10. Similarly, each of the low-noise amplifiers 32 may be electrically connected to a different antenna element 28 and may be used during the reception of signals (e.g., interrogation signals or transponder reply messages from other aircraft) to increase the power level of signals received at the antenna element 28. Both the power 30 and low-noise amplifiers 32 may be of any suitable design and construction.

In configurations, the system 10 may also include a transceiver module 20 having a plurality of transmitter units 34 and a plurality of receiver units 36. Each of the plurality of transmitter units 34 may be electrically connected to a different antenna element 28 and may be used to transmit electromagnetic signals. Similarly, each of the plurality of receiver units 36 may be electrically connected to a different antenna element 28 and may be used to receive electromagnetic signals. Both the transmitter and receiver units 34, 36 may be of any suitable design and construction.

In one example configuration, the system 10 may include a processing module 22 having a direct digital synthesis (DDS) module 44; a processor module 46; and a phase detector module 48. The DDS module 44 may be electrically connected to each transmitter and receiver unit 34, 36 and to other components of the processing module 22, and may be operable to perform beam-forming functions in connection with transmission operations. More specifically, the DDS module 44 may direct the transceiver module 20 to use one or more of the antenna elements 28 when transmitting. The processor module 46 may be electrically connected to each transmitter and receiver unit 34, 36 and to other components of the processing module 22, and may be operable to manage transmission and reception operations. The phase detector module 48 may be electrically connected to the transmitter and receiver units 34, 36 and to other components of the processing module 22, and may be operable to receive signals from the receiver units 36 and determine phase differences between cross channels. However, the system 10 may include any beam forming and bearing processing functionality and associated hardware to provide traffic-related functionality. The secondary antenna 24 may be utilized to improve system performance regardless of the particular configuration of the primary antenna 16 and associated modules.

The secondary antenna 24 may be positioned between the reflective material 14 and at least a portion of the primary antenna 16, and may be operable to absorb at least a portion of the reflected electromagnetic signals and thereby inhibit the reflected electromagnetic signals from reaching the primary antenna 16. In one implementation, the secondary antenna 24 may be positioned approximately a multiple of one-quarter (e.g., one-quarter, one-half, three-quarters, one) wavelength away from the primary antenna 16, or approximately $(2*n-1)/4$ increments behind the rear antenna elements 28 of the primary antenna 16 where the peaks of the electric field from the reflected electromagnetic waves are terminated and the nulling effect on the rear elements is substantially reduced. The effect may be maximized when the secondary antenna 24 is positioned close to the primary antenna 16, but this may disturb the calibration of the primary antenna 16 so the actual position of the secondary antenna 24 may be the result of a compromise between desired and undesired effects. The secondary antenna 24 may be of any suitable design and construction. For example, the secondary antenna 24 may be a monopole antenna. The secondary antenna 24 may include one or more antenna elements.

The secondary antenna 24 may be electrically connected to a fixed or tunable electrically resistive load 25. For instance, in one configuration, load 25 may present a fixed impedance of 50 ohms selected to match the desired performance of the system 10. In other configurations, load 25 may be tunable (e.g., via the use of selectable potentiometers, varistors, resistors, capacitors, inductors, combinations thereof, and the like). In tunable configurations, load 25 may be mechanically adjusted and/or electrically adjusted via the processing module 22 or other system 10 components.

In one implementation, the secondary antenna 24 is positioned between the primary antenna 16 and the electromagnetically reflective material 14, and then the electrically resistive load is tuned to produce the desired performance with regard to reducing undesired reflections of electromagnetic signals and thereby improving transponder interrogation and received signal performance. Thus, for example, the impedance of the load 25 may be automatically or manually tuned to match the desired performance of the system 10.

Figure 3:
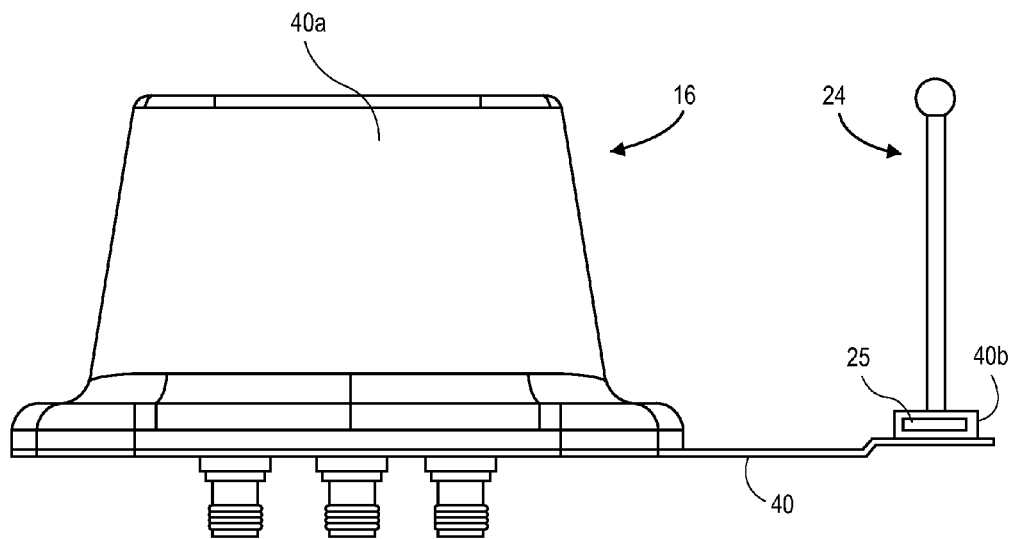
FIG. 3 is an elevation view of an antenna component of the air-traffic information system of FIG. 1.
Figure 4:
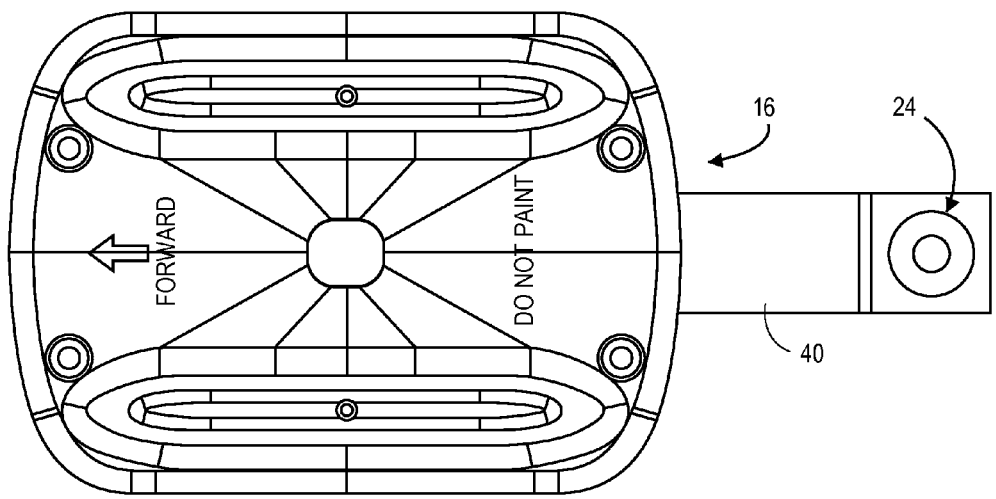
FIG. 4 is a plan view of the antenna component of FIG. 3.

Housing 40 may be configured to retain any portion of the system 10, including antennas 16, 24, modules 18, 20, 22, or any combination thereof. In one configuration, primary antenna 16 is at least partially retained by a primary portion 40a of housing 40 while secondary antenna 24 is at least partially retained by a secondary portion 40b of housing 40. Such a configuration enables the primary portion 40a of the housing 40 to retain a generally conventional configuration suitable for installation on aircraft 12 utilizing conventional mounting devices and apertures. In one example configuration as shown in FIGS. 3 and 4, the secondary portion 40b of the housing 40 may be attached to the primary portion 40a of the housing 40 using a baseplate extension or other coupling structure so that housing 40 may be installed on aircraft 12 using only holes for the primary portion 40a such that no additional holes need be made in the aircraft 12 for the secondary portion 40b and/or secondary antenna 24. This facilitates evaluating secondary antennas 24 of differing designs and construction to achieve optimum performance. In various configurations, the housing 40 may be adjustable to vary the position of the secondary portion 40b with respect to the primary portion 40a to facilitate desired placement of the secondary antenna 24.

Figure 5:
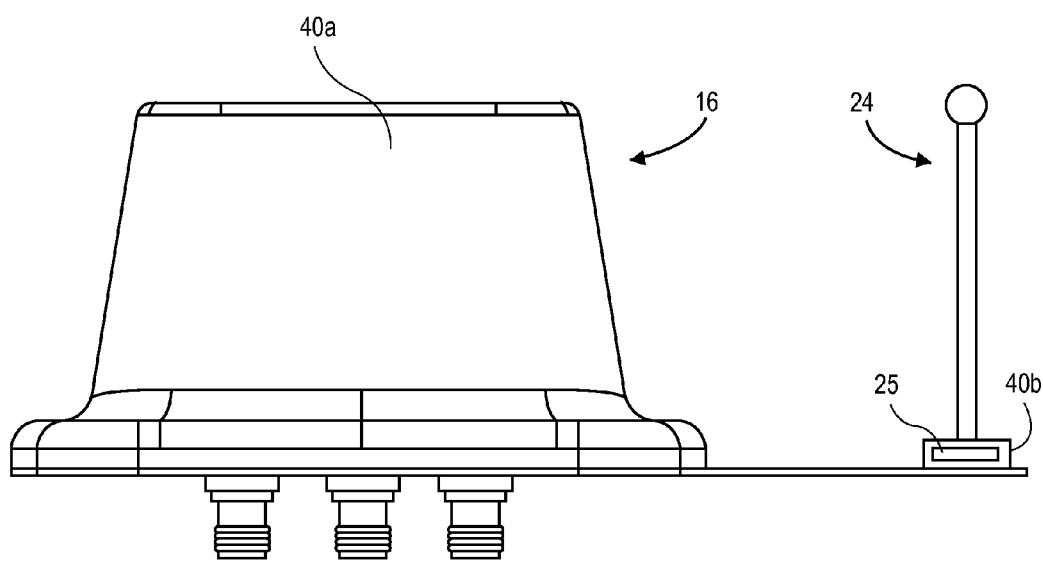
FIG. 5 is a elevation view of another configuration of an antenna component of the air-traffic information system of FIG. 1.

In the example illustrated in FIG. 5, the primary portion 40a and secondary portion 40b of the housing 40 are separable to enable independent positioning on the aircraft 12. For example, the primary portion 40a and secondary portion 40b may lack the baseplate extension described above and be provided as independent housings. In such configurations, the primary antenna 16 and secondary antenna 24 may share the same ground plane.

Although described in the context of an airborne system installed on an aircraft, embodiments the present invention may be employed in other contexts and applications, including water, land, and space vehicles, and in fixed or portable forms using any suitable vehicle-traffic information system.

In the following discussion, an example aircraft 12 is described into which the air-traffic information system 10 may be incorporated. It should be understood that this environment is merely illustrative and non-limiting, and that the air-traffic information system may be alternatively incorporated into a large variety of different environments.

Example Environment

The example environment comprises an air-traffic information system in the form of an aircraft collision avoidance and traffic alert system 10 employing TAS technology, such as the Garmin GTS 8XX/8000 system which uses four element phase interferometry processed from the magnitude and phase of received radio-frequency signals on each antenna element to generate a bearing to another aircraft. The system 10 is installed in a small aircraft 12 in the form of a helicopter having a rotor mast, wherein the rotor mast constructed at least in part of the reflective metallic material 14 that reflects radio-frequency signals. Referring to FIG. 1, the system 10 broadly comprises the primary antenna 16; the amplification module 18; the transceiver module 20; the processing module 22; and the secondary antenna 24. Referring to FIGS. 2-5 the primary antenna 16 includes four antenna elements 28a-d arranged in a polygonal pattern and operable to facilitate the transmission and reception of the radio-frequency signals.

The amplification module 18 includes the plurality of power amplifiers 30, wherein each power amplifier 30 is electrically connected to a different antenna element 28a-d and operable to increase the power level of signals generated by the corresponding transmitter unit 34 and sent to that antenna element 28a-d. The amplification module 18 further includes the plurality of low-noise amplifiers 32, wherein each low-noise amplifier 32 is electrically connected to a different antenna element 28a-d and operable to increase the power level of signals received at that antenna element 28a-d and sent to the corresponding receiver unit 36.

The transceiver module 20 includes the plurality of transmitter units 34 electrically connected to the primary antenna 16 and operable to transmit the radio-frequency signals via the primary antenna 16, wherein each transmitter unit 34 is electrically connected to a different antenna element 28a-d. The transceiver module 20 further includes the plurality of receiver units 36 electrically connected to the primary antenna 16 and operable to receive the radio-frequency signals via the primary antenna 16, wherein each receiver unit 36 is electrically connected to a different antenna element 28a-d.

The processing module 22 includes the DDS module 44; the processor module 46; and the phase detector module 48. The DDS module 44 is electrically connected to the transceiver module 20 and to other components of the processing module 22, and is operable to perform beam-forming functions in connection with transmission operations. The processor module 46 is electrically connected to the transceiver module 20 and to other components of the processing module 22, and is operable to manage transmission and reception operations. The phase detector module 48 is electrically connected to the transceiver module 20 and to other components of the processing module 22, and is operable to receive signals from the receiver units 36 and determine phase differences between cross channels.

The secondary antenna 24 is mounted using a baseplate to the primary housing 40a of the primary antenna 16 and positioned between the reflective material 14 of the rotor mast and at least a portion of the primary antenna 16, and is operable to absorb at least a portion of the reflected radio-frequency signals and thereby substantially prevent them from reaching the primary antenna 16. The secondary antenna 24 is a monopole antenna, electrically connected to an electrically resistive load 25 of 50 Ohms, and positioned approximately 5 inches from the center of the plurality of antenna elements 28a-d of the primary antenna 16, or approximately one-quarter wavelength behind the rearmost antenna elements 28c,d. In testing, this resulted in approximately +1.5 higher power between the rearmost antenna elements 28c,d, phase of approximately between 10 degrees to 15 degrees, significant attenuation of the standing wave, and improved performance by approximately 70%, including reducing ghosting and bearing errors.

Figure 6:
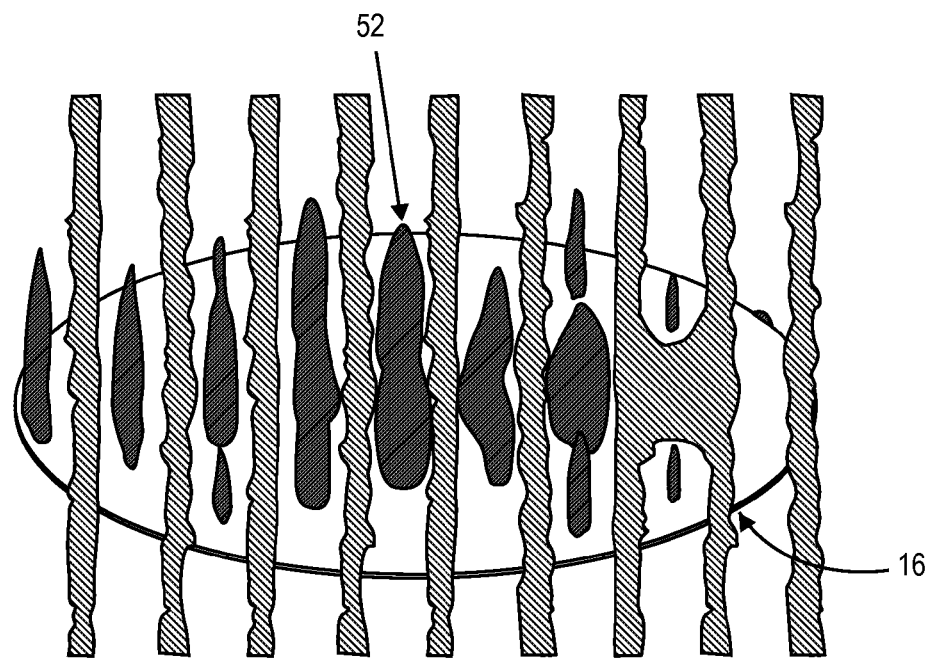
FIG. 6 is a plot of a standing wave created by a reflective surface located one wavelength behind a first antenna.
Figure 7:
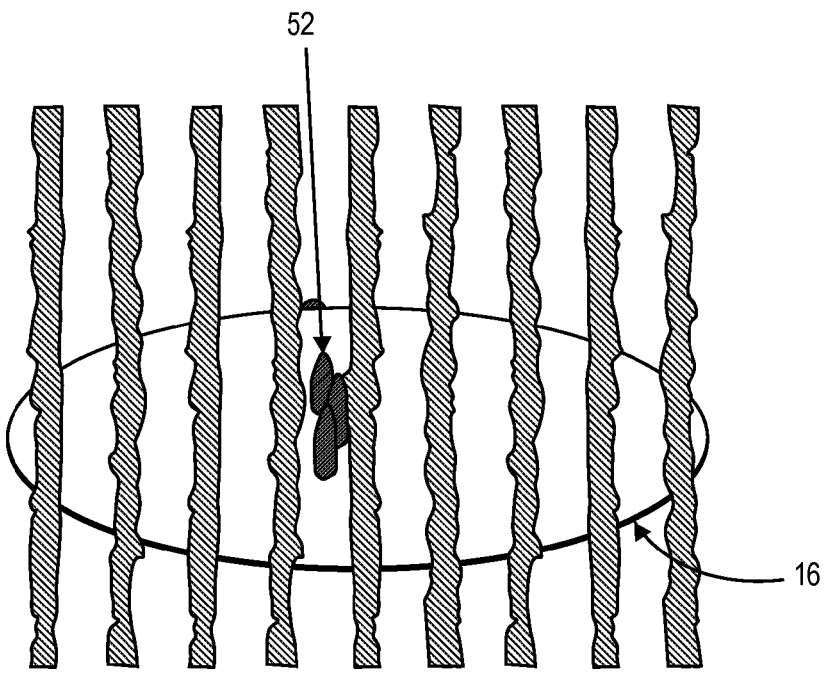
FIG. 7 is a plot of the standing wave of FIG. 5 attenuated by a second antenna of the air-traffic information system of FIG. 1.

FIG. 6 is a plot of a standing wave 52 created by the reflective material 14 located one wavelength behind the rear antenna elements 28c,d of the primary antenna 16 without the benefit of the secondary antenna 24. FIG. 7 is a plot of the standing wave 52 of FIG. 6 attenuated by the secondary antenna 24 provided by embodiments of the present invention.

CONCLUSION

Although the air-traffic information system has been described with reference to various possible embodiments, implementations, features, and example environments, it is to be understood that the claims are not necessarily limited to these or any other specific embodiments, implementations, features, or example embodiments.

What is claimed is:

1. An airborne traffic system installed on an aircraft, the aircraft having a reflective material that at least partly reflects radio-frequency signals, the traffic system comprising:

a primary antenna operable to transmit interrogation signals and receive interrogation replies from other aircraft; and a secondary antenna positioned between the reflective material and the primary antenna, the secondary antenna electrically connected to an electrically resistive load and configured as an absorber having a matched impedance to at least partially absorb reflections of the interrogation signals or interrogation replies and inhibit the reflections from reaching the primary antenna.

2. The system of claim 1, further including a transceiver module coupled with the primary antenna, the transceiver module including:
   a plurality of transmitter units operable to generate the interrogation signals; and
   a plurality of receiver units operable to receive the interrogation replies.

3. The system of claim 1, wherein the system is configured as a Traffic Advisory System (TAS) and/or a Traffic Alert and Collision Avoidance System (TCAS) system.

4. The system of claim 1, wherein the electrically resistive load has an impedance of 50 ohms.

5. The system of claim 1, wherein the secondary antenna is a monopole antenna.

6. The system of claim 1, further including a housing for retaining the primary and secondary antennas, wherein secondary antenna is located on the housing at a multiple of one-quarter wavelength away from the primary antenna.

7. The system of claim 6, wherein the housing is configured for mounting on a helicopter.

8. The system of claim 1, further including a housing including a primary portion for retaining the primary antenna and a secondary portion for retaining the secondary antenna.

9. The system of claim 1, further including a housing for retaining the primary and secondary antennas, wherein secondary antenna is located on the housing at a one-quarter wavelength away from the primary antenna.

10. A method of reducing interference in an airborne traffic system installed on an aircraft, the method comprising:
    determining the location of a reflective material located on the exterior of the aircraft;
    positioning a primary antenna on the exterior of the aircraft, the primary antenna operable to transmit interrogation signals and receive interrogation replies from other aircraft; and
    positioning a secondary antenna on the exterior of the aircraft between the location of the reflective material and the primary antenna, the secondary antenna configured as an absorber having a matched impedance to at least partially absorb reflections of the interrogation signals or interrogation replies and inhibit the reflections from reaching the primary antenna.

11. The method of claim 10, wherein the primary and secondary antennas are retained by a housing and positioning the primary and secondary antennas includes installing the housing such that the secondary antenna is positioned between the primary antenna and the reflective material after installation.

12. The method of claim 10, wherein the aircraft is a helicopter, the reflective material is a rotor mast of the helicopter, and the secondary antenna is positioned between the rotor mast and the primary antenna.

13. The method of claim 10, wherein the primary antenna and secondary antenna are separately positioned on the aircraft.

14. The method of claim 10, further including determining the matched impedance of the secondary antenna.

15. An airborne traffic system installed on an aircraft, the aircraft having a reflective material that at least partly reflects radio-frequency signals, the traffic system comprising:
    a primary antenna operable to transmit interrogation signals and receive interrogation replies from other aircraft, the primary antenna comprising a phased array antenna having a plurality of antenna elements operable to facilitate the transmission and reception of the interrogation signals and the interrogation replies;
    a transceiver module including—
        a plurality of transmitter units operable to transmit the interrogation signals via the phased array antenna, wherein each transmission unit is electrically connected to a different one of the antenna elements, and
        a plurality of receiver units operable to receive the interrogation replies via the phased array antenna, wherein each receiver unit is electrically connected to a different one of the antenna elements; and
    a secondary antenna positioned between the reflective material and the primary antenna, the secondary antenna electrically connected to an electrically resistive load and configured as an absorber having a matched impedance to at least partially absorb reflections of the interrogation signals or interrogation replies and inhibit the reflections from reaching the primary antenna.

16. The system as set forth in claim 15, wherein the aircraft is a helicopter and the reflective material is part of a rotor mast.

17. The system as set forth in claim 15, wherein secondary antenna is located a multiple of one-quarter wavelength away from the phased array antenna.

18. The system as set forth in claim 15, further including—
    a plurality of power amplifiers, wherein each power amplifier is electrically connected to a different antenna element and operable to increase a power level of the first radio-frequency signals generated by the transmitter unit and sent to the antenna element; and
    a plurality of low-noise amplifiers, wherein each low-noise amplifier is electrically connected to a different antenna element and operable to increase the power level of the second radio-frequency signals received by the antenna element and sent to the receiver unit.

19. The system as set forth in claim 15, further including a direct digital synthesis module electrically connected to the transceiver module and operable to perform a beam forming function by directing the transceiver module to transmit the first radio-frequency signals from a particular one or more of the antenna elements.

20. The system of claim 15, wherein the system is configured as a Traffic Advisory System (TAS) and/or a Traffic Alert and Collision Avoidance System (TCAS) system.

21. The system as set forth in claim 15, wherein secondary antenna is located a one-quarter wavelength away from the phased array antenna.

* * * * *